(12) United States Patent
Del Bianco et al.

(10) Patent No.: US 7,769,684 B2
(45) Date of Patent: Aug. 3, 2010

(54) SEMI-QUANTITATIVE RISK ANALYSIS

(75) Inventors: Denis Del Bianco, Rio de Janeiro (BR); Julio Rangel De Albernaz, Rio de Janeiro (BR); Deram Tavares, Rio de Janeiro (BR); Henrique Fernandes Carvalho, Botafogo (BR); Patricia Castro Jardim, legal representative, Botafogo (BR); Luiz Guilherme Pereira Da Silva, Rio de Janeiro (BR); Acyr Avila da Luz Neto, Basel (CH); Dario Derenzi Neto, Rio de Janeiro (BR); Derval Beltrame, Jr., Viloria (ES)

(73) Assignee: Accenture Global Services GmbH, Schaffhausen (CH)

( * ) Notice: Subject to any disclaimer, the term of this patent is extended or adjusted under 35 U.S.C. 154(b) by 564 days.

(21) Appl. No.: 11/436,978

(22) Filed: May 19, 2006

(65) Prior Publication Data

US 2007/0271198 A1 Nov. 22, 2007

(51) Int. Cl.
*G06Q 40/00* (2006.01)
*G06F 17/60* (2006.01)
(52) U.S. Cl. .......................................... 705/38; 705/7
(58) Field of Classification Search ................ 705/35
See application file for complete search history.

(56) References Cited

U.S. PATENT DOCUMENTS 7,318,039 B2 * 1/2008 Yokota et al. ................. 705/7
7,440,905 B2 * 10/2008 Ellis et al. .................... 705/7
2002/0138318 A1 * 9/2002 Ellis et al. ..................... 705/7
2002/0198750 A1 * 12/2002 Innes et al. .................... 705/7
2003/0023470 A1 * 1/2003 Labbi ............................. 705/7
2003/0074291 A1 * 4/2003 Hartung et al. ............. 705/35
2003/0088446 A1 * 5/2003 Phelps et al. .................. 705/7
2003/0135399 A1 * 7/2003 Ahamparam et al. ......... 705/7
2004/0015376 A1 * 1/2004 Zhu et al. ...................... 705/7
2004/0148566 A1 * 7/2004 Jaffar et al. ................ 715/503
2004/0254959 A1 * 12/2004 Dierksen et al. ......... 707/104.1

(Continued)

OTHER PUBLICATIONS

"Identifying, justifying and prioritizing technical projects", Jonathan Worstell, Jeffrey Worstell, John Worstel. Chemical Engineering Progress. New York: Mar. 2002. vol. 98 iss. 3: p. 72, 8 pgs.*

(Continued)

*Primary Examiner*—Hani Kazimi
*Assistant Examiner*—Mohammad Z Shaikh
(74) *Attorney, Agent, or Firm*—Finnegan, Henderson, Farabow, Garrett & Dunner, LLP

(57) ABSTRACT

A semi-quantitative analysis on the risk management process increases the possibility of performing an accurate risks comparison, making easier the identification of which risks shall be prioritized and shall receive the greatest mitigation efforts. Specifically, the semi-quantitative risk analysis enables an improved risks comparison for evaluating the consequences of each risk considering its impacts on the project's Net Present Value (NPV), reflecting the project's cash flow at different times. The use of such method makes the prioritization process more efficient, helping the managers and other personnel involved on the process to focus their efforts to the most critical risks for the project's success. In this sense, the risk management process becomes more efficient and better able to provide better support to the project decision makers.

22 Claims, 8 Drawing Sheets

U.S. PATENT DOCUMENTS

| | | | |
|---|---|---|---|
| 2005/0060213 A1* | 3/2005 | Lavu et al. | 705/7 |
| 2005/0065805 A1* | 3/2005 | Moharram | 705/1 |
| 2005/0283751 A1* | 12/2005 | Bassin et al. | 717/100 |
| 2006/0173762 A1* | 8/2006 | Clater | 705/35 |
| 2006/0184483 A1* | 8/2006 | Clark et al. | 706/45 |
| 2007/0106599 A1* | 5/2007 | Hochberg et al. | 705/38 |
| 2007/0250377 A1* | 10/2007 | Hill et al. | 705/11 |

OTHER PUBLICATIONS

"Developing a risk management matrix for effective project planning—an empirical study", Sumit Datta, S K Mukherjee. Project Management Journal. Sylva: Jun. 2001. vol. 32, iss. 2; p. 45, 13 pages.*

"The application of risk management in Infrastructure Construction Projects", Ali, Rashed, Cost Engineering, Aug. 2005, v47n8 pp. 20-27.*

* cited by examiner

Gestão de Riscos - UN-ES - Jubarte/Cachalote

Risco: Atraso na LI/LO

ID:
Situação:
Data da Criação: 04/28/2004 09:35:25 AM
Autor: Dario Derenzi - ACENTURE ☑ Campos com preenchimento obrigatório

1. Identificação

| | |
|---|---|
| Ativo: | Jubarte/Cachalote |
| Projeto: | Fase 1 |
| Disciplina: | SMS |
| Categoria: | Político |
| Responsável: | Paulo Roberto De Azevedo |
| Descrição do risco: | Atraso na LI/LO |
| Fase de Ocorrência: | ☒ 1 - EVTE   ☐ 2 - Contratação   ☐ 3 - Construção / Execução |
| | ☒ 4 - Instalação   ☐ 5 - Operação   ☐ 6 - Desmobilização |
| Probabilidade de Ocorrência: | B - Média (de 40 a 60%) |
| Classificação do risco: | ● Gerenciável   ○ Não Gerenciável |
| Justificativa: | |
| Sintomas do risco: | |
| Principais envolvidos: | |

2. Avaliação de Impactos Quantitativos

SEMI-QUANTITATIVE RISK ANALYSIS

FIELD OF THE INVENTION

The present invention relates generally to semi-quantitative risk analysis for a risk management process. Specifically, the present invention provided an improved framework and tool for identifying, qualifying, comparing, and managing risks associated with a complex project.

BACKGROUND OF THE INVENTION

Project risks are events or uncertain conditions that, if they occur, provoke a positive or negative effect in the project objectives. Each of the risks has a cause and, if it occurs, a consequence. Thus, a project risk analysis is typically performed at the onset of many projects to permit a team working on the project to identify and evaluate the potential problems or risks that are associated with that project. With projects of ever increasing complexity and requirements, the corresponding risk analysis becomes more complex and difficult.

Risk management consists of a systematic process for the identification, analysis and mitigation the project risks, aiming to minimize the probabilities of occurrence and/or the severity of the consequences of the adverse events to the objectives of the project. Improvements in risk management generally focus on the establishment of objective procedures that aim at risks reduction, creation of synergy between different areas for most complex risks mitigation and creation of more realistic vision of the main project deviations. In this way, the project team can try to identify and prevent a project's undesired events, thereby minimizing the impact of negative events on the project Typically, the risk analysis or assessment that is completed for an project is dependent on the type of project. The risk analysis is often completed using a spreadsheet or database program to simplify and provide some standardization to the risk analysis process. Even in organizations that have a standard written risk assessment procedure, different groups in the organization often make custom modifications to the standard procedure to accommodate the particular type of project worked on by the group. In other words, even where there is standard written risk assessment procedure, each group may have its own customized risk assessment procedure implemented.

Therefore, what is needed is a management application to implement a risk process for engineering that can be used by all users of an organization or company to analyze, display, monitor and store the risks assessments for a project

SUMMARY OF THE INVENTION

The present invention relates to a semi-quantitative analysis on the risk management process. The semi-quantitative risk analysis is an evolution of the traditionally used qualitative risk analysis that increases the possibility of performing an accurate risks comparison, making easier the identification of which risks shall be prioritized and shall receive the greatest mitigation efforts. Specifically, the semi-quantitative risk analysis enables an improved risks comparison for evaluating the consequences of each risk considering its impacts on the project's Net Present Value (NPV), reflecting the project's cash flow at different times. The use of such method makes the prioritization process more efficient, helping the managers and other personnel involved on the process to focus their efforts to the most critical risks for the project's success. In this sense, the risk management process becomes more efficient and better able to provide better support to the project decision makers.

One embodiment of the present invention is directed to a method of managing risks associated with a project and a computer program product implementing the method. The method includes the steps of defining impact criteria for risks of a project and identifying risks associated with the project. The method also includes storing risk information in a database, assessing risk using the defined impact criteria and preparing mitigation the risk. The method further includes storing mitigation information in the database. Finally, the method includes monitoring the risks associated with a project over the life of the project, updating the risk information and the mitigation information in the database and repeating the steps of monitoring the risks and updating the risk information and the mitigation information in the database until each of risks is finished.

Another embodiment of the present invention is directed to a system for analyzing and managing semi-quantitative risks associated with a project. The system includes a server computer having a storage device and a processor. The system further includes a risk management application to analyze and manage risks associated with a project. The risk management application is stored in the storage device of the server computer. The semi-quantitative risk management application includes a database to store information relating to the project. The application also includes software for providing and storing risk impact criteria for all risks of the project, for providing risk information, and for providing mitigation information. The application further includes software for assessing the risks based on the semi-quantitative risk impact criteria and for categorizing the risks. The application further updates the risk information and the mitigation information in the database based on collected information from field experiences.

One advantage of the present invention is that all groups in a company or organization can access and use a common risk assessment user interface, report format, and risk categories, which improves the risk assessment.

Another advantage of the present invention is that productivity is increased by reducing the cycle time to create project risk assessments. Risk assessments can be generated and displayed automatically providing a significant manpower and cost savings.

Still another advantage of the present invention is that all projects' risks and mitigations are stored in a common database for easy retrieval, review and revision by appropriate users.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 6 is an exemplary input screen for providing user-specified data to the risk management process of FIG. 5.

DETAILED DESCRIPTION OF THE PREFERRED EMBODIMENTS

Embodiments of the present invention provide a semi-quantitative risk analysis for a risk management process. The methodology provided in the present invention improves on traditionally used qualitative risk analysis by providing greater accuracy in risks comparison, thereby helping to identify risks to be prioritized to receive the greatest mitigation efforts.

Specifically, the semi-quantitative risk analysis provided in embodiments of the present invention allows the risks comparison by evaluating the consequences of each risk considering its impacts on a project's Net Present Value (NPV). The use of such method makes the prioritization process more efficient, helping the managers and other personnel involved on the process to focus their efforts to the most critical risks for the project's success. In this sense, the risk management process becomes more efficient being able to provide better support to the project decision makers.

Figure 1A:
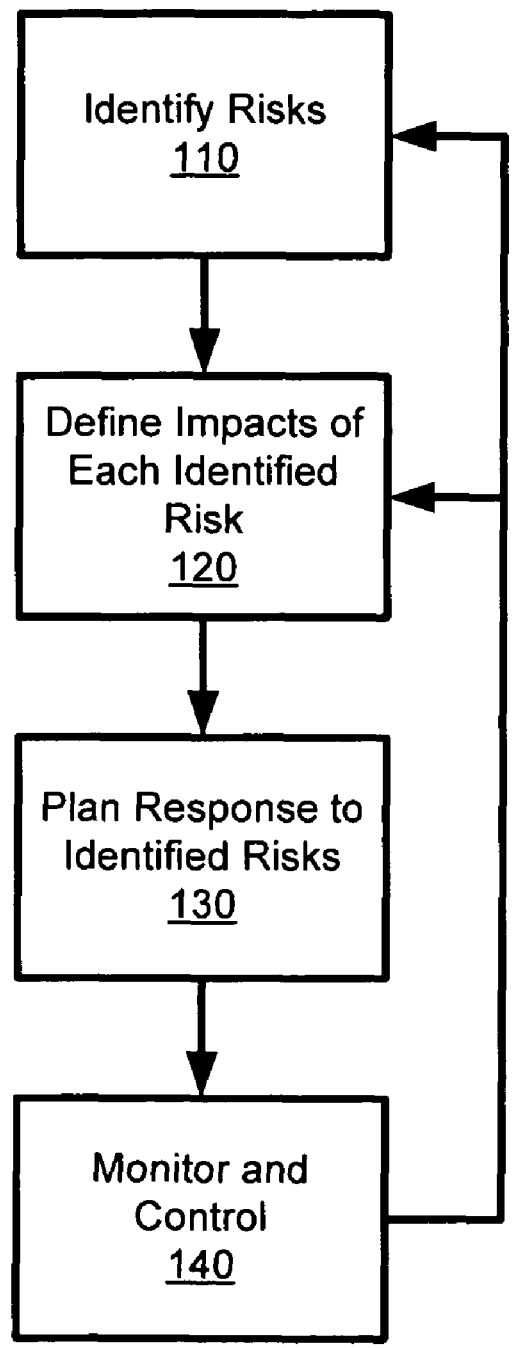
FIGS. 1A-1B and 3 are flowcharts illustrating the steps in a semi-quantitative risk management process in accordance with embodiments of the present invention.

Referring now to FIG. 1A, a project risk management process 100 for the management of risks in a project in embodiments of the present invention generally comprises the steps of risk identification 110, defining the risk impacts 120, development of the corresponding responses 130, and monitoring and control 140 of project risks, the probabilistic issues that may generate negative impacts on the expected project result. The execution of this project risk management process 100, as illustrated in FIG. 1A, aims at minimizing the probability of any occurrences and the severity of the consequences of events adverse to the project objectives. It should be appreciated that the methodology of the present invention may be adapted to also handle so-called project opportunities, probabilistic risks that generate positive impacts for the project.

Returning now to FIG. 1A, the identification of project risks in step 110 comprises various techniques to identify and register the risks and to identify and register possible impacts. Thus, the identification of project risks in step 110 comprises a critical analysis the project, including the analysis of contracts governing, an analysis of previous projects, discussion sessions with project team members and external guests, and consultation and interviews with experts and specialists for surveying all risk situations for the project. For example, the identification of project risks in step 110 may include structuralized meetings in which a risks management team discusses and evaluates the risks of the project, including monthly indicators evaluation, response plans status presentation, creation of the action plans, reevaluation of probabilities and risks impacts, new risks discussion, risks conclusion, discussion and pending actions control, etc.

Alternatively, embodiments of the present invention, described in greater detail below, provide a computer system and tool to aid a user to identify project risks in step 110.

An example of a risk constantly present in the political and economic scenario that involves large projects, either in projects is the risk of unforeseen changes in the tax legislation during the execution of a project. Particularly in projects with a long duration, such as more than five years, there is the possibility of changes in the tax legislation, especially in countries with an unstable economy, which consists in a considerable risk for the expected project results. Changes like these can cause impacts mainly on the capital and operational expenditures, to the extent that the variation of taxes tends to fall over the investment and operational costs. Notwithstanding, they can also generate impacts on the time frame or even on the expected revenue of a project, depending on the extension of the tax change and its impacts on the contractual structures in force.

Continuing with FIG. 1A, the defining of the risk impacts in step 120, explained in more detail, generally includes estimating the probabilities and impact for each of the various identified risk, as well as determining other effects of each risk. By combining these parameters, the identified risks may be evaluated and prioritized. In particular, the present invention provides a novel framework for evaluating the various identified risks by estimating the monetary impact of the risks on the expected profitability of the project. As described in greater detail later in this application, embodiments of the present invention, provide a software-based tool to assist users in the quantifying and qualifying the identified risks of project risks.

In embodiments of the present invention, the defining of the risk impacts in step 120 may further optionally comprise the analysis of the costs involved in the mitigation of each risk, aiming at performing a probability study on the total project risk and on the expected result from the investment made in the mitigation effort of each risk, so as to evaluate the chance of said effort of reaching its cost and time frame goals. In step 120, the severity of the impacts of the risk is evaluated, the occurrence probability of the risks is evaluated, and the risks are prioritized.

Continuing with FIG. 1A, the development of responses in step 130 typically includes planning mitigation and contingency actions, establishing goals, and defining responsibility for risk and mitigating actions. For example, the response may include designating a single person or group to be responsible for treating each risk, with this person(s) being in charge of planning the actions required for reducing the probability of any occurrence and/or any potential risk impacts on the project and also for the designation of those responsible for the execution of these actions. Embodiments of the present invention may further include a software tool that allows users to separately address each of the identified risks as needed to provide appropriate responses.

Finally, during the risk control step 140, the risks are monitored and the response plans are followed-up and the results are evaluated to bring up to date each status task. At this stage, new risks may be identified and the existing ones can be addressed or reprioritized by recursively repeating step 110-140. Again, embodiments of the present invention provide a software tool to track the status of various identified risks as well as monitor the overall status of the project, and to provide these status conditions to users as needed to monitor the risks and to prompt investigation of newly emergent risks.

The achievement of the activities described in each stage ensures that the project has all its risks correctly mapped and controlled, however, as demonstrated below, details not observed in the qualitative analysis stage may lead to wrongful conclusions, possibly affecting the reliability of the final result and reducing the effectiveness of the risk management process.

Each of the steps in the project risk management process 100 is now addressed in greater detail. Returning to FIG. 1A, the qualitative analysis of step 120, a process executed right after the identification of the risks in step 110, generally include estimating the probability of any occurrences and the possible impacts of risks in a simple manner, based on predefined scales so as to generate a list of priority project risks. These scales can be strictly qualitative and divided in user-defined categories, for example, in "Very Low", "Low", "Moderate", "High" and "Very High", or the scales can be associated to numerical values, as exemplified in Tables 1-3 below:

TABLE 1

Probability of Occurrence

| | |
|---|---|
| 1 | Very Low Probability (0-5%) |
| 2 | Low Probability (5%-10%) |
| 3 | Medium Probability (10%-20%) |
| 4 | High Probability (20%-50%) |
| 5 | Very High Probability (>50%) |

TABLE 2

Schedule Impact

| | |
|---|---|
| 0 | There is no Impact on Schedule |
| 1 | Up to 7 Days Delay |
| 2 | 7 to 15 Days Delay |
| 3 | 15 to 30 Days Delay |
| 4 | 30 to 60 Days Delay |
| 5 | More Than 60 Days Delay |

TABLE 3

Cost Impact

| | |
|---|---|
| 0 | There is no Impact on Cost |
| 1 | Up to US$ 100K |
| 2 | US$ 100K to 200K |
| 3 | US$ 200K to 500K |
| 4 | US$ 500K to 1 Million |
| 5 | More Than US$ 1 Million |

Figure 1B:
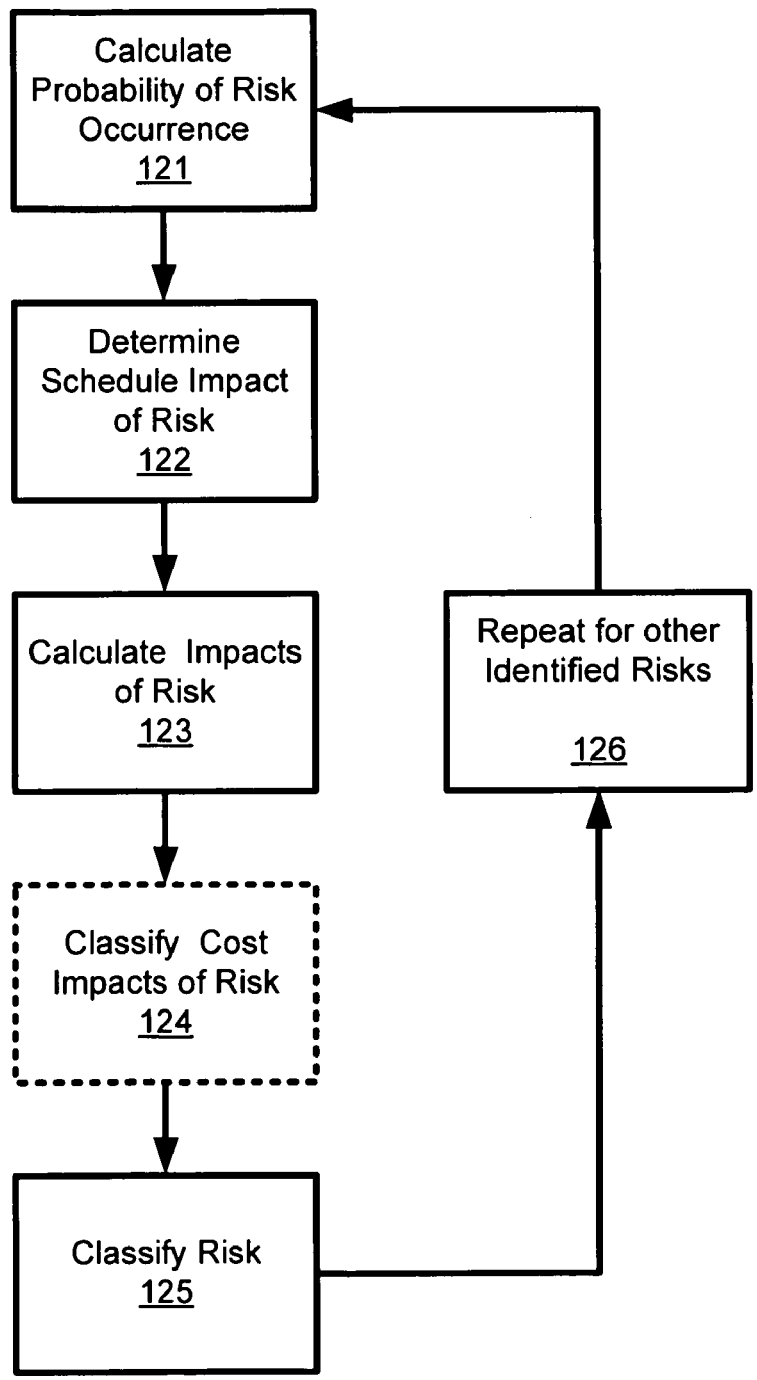

Turning now to FIG. 1B, the defining of the impacts to the identified risks in step 120, corresponding to the exemplary Tables 1-3, generally includes the steps of determining the probability that the risk will occur in step 121, determining scheduling impact of the risk in step 122, and determining a cost impact of the risk in step 123. Optionally the cost impacts of the risk from step 123 may be used to classify the risks, step 124. Then, the process of steps 121-124 may be repeated for other risks, step 126.

This general discussion the defining of the impacts to the identified risks in step 120 assumes that the risks are statistically independent events, such that each of the risks are separately evaluated; i.e., the occurrence of one risk does not impact the other risks. It should be readily apparent however, that various techniques may employed with statistically related risks, such as risks having related incidences of occurrence (e.g., occurrence of a first risk impacts occurrence of a second risk) or related impacts (e.g., occurrence of a first risk impacts consequences of a second risk). Techniques to address the related include, for example, calculating the covariance of the risk events or alternatively, grouping together related risks and then calculating the probabilities and impacts for each of the possible combination of the risks.

It should be further appreciated that the above discussion employs simplistic statistical models in calculating the probability or impact of the risks. Complex statistical models may be employed as well to assign various expected values and spreads for the impacts and probabilities for the risks. Thus, in contrast to the static, predefined occurrence probabilities, scheduling impacts, and cost impacts, as provided above in Tables 1-3, probabilistic models may be employed to determine these effects, whereby the probability of the occurrence of the risk is a random event having defined statistical characteristics. For example, the expected value of the probability of the occurrence for a risk may be used for comparison to other risks. Similarly, the probability of occurrence may otherwise be waited to reflect other project concerns By adding the value of the risk cost impact from step 121 to its time frame impact from step 122, one may obtain the severity of this risk, i.e., in order to obtain the sum of all impacts, one should obtain the actual correlation between the time frame impacts from step 122 and the cost impacts from step 123. For that, it may be necessary to calculate, for example, how much a one-month delay corresponds to an increase in the operational cost of the project. This way, a schedule impact from step 122 may be assigned a cost impact in step 123. Accordingly, it is possible to compare all risks correctly, which allows risks that have only a cost impact to be compared to risks that have a time frame impact only and to risks that have a cost impact and a time frame impact. Calculation of the cost impact in step 123 is described in greater detail below.

After the cost impact is calculated in step 123, the total severity, or cost, of the risk may be classified in step 124, for example, with a 5-point scale with values corresponding to "Very High", "High", "Medium", "Low", and "Very Low".

Figure 2:
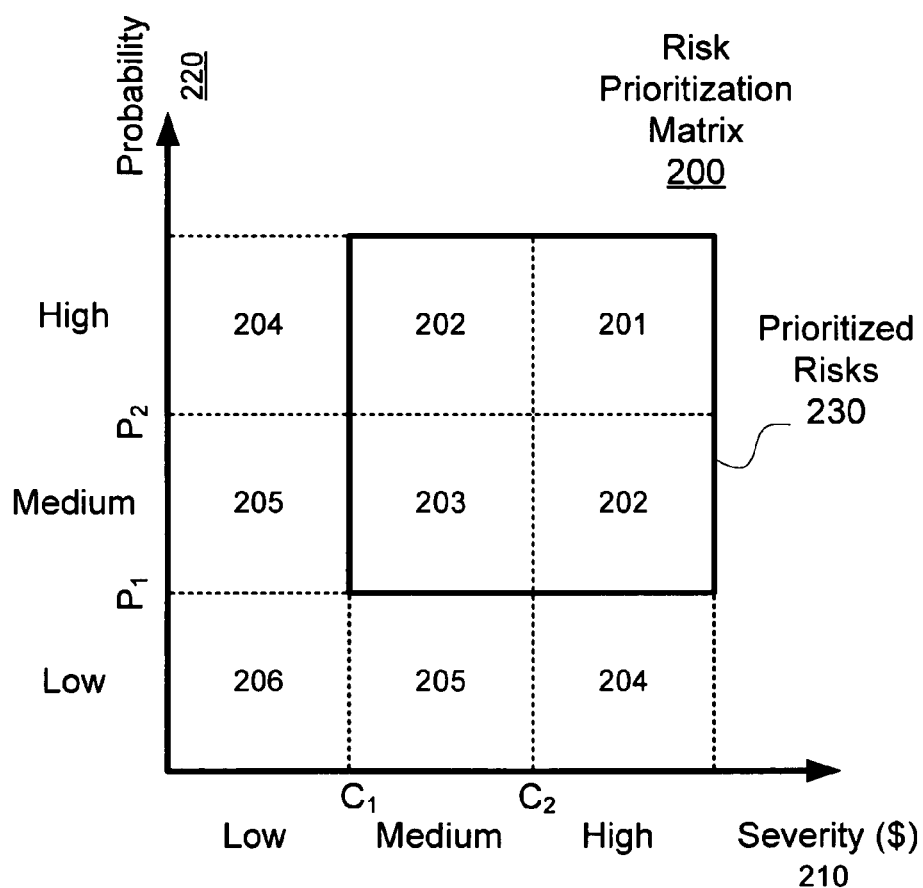
FIG. 2 depicts a risk prioritization matrix produced from the risk management process of FIGS. 1A-1B and 3 in accordance with embodiments of the present invention.

Continuing with defining of the impact of the risk in step 120, the risk may be classified in step 125 according to its probability of occurrence from step 121 and its severity (e.g., potential cost impact) from step 123. For example, the severity score from step 124 may be used together with an occurrences probability listing developed in step 121, such as defined above in exemplary Table 1, to generate a risk prioritization matrix 200 illustrated in FIG. 2. In particular, the values estimated for the probability of an occurrence in step 121 and the severity of a risk in step 123, may be used to categorize the risk within a region of the prioritization matrix 200. Each of the regions in the prioritization matrix 200 may be defined according to user the criteria of severity 210 (as defined in step 123 and/or step 124) and probability of occurrence 220 as defined in step 121. The scale and particular values of costs $C_1$ and $C_2$ for the severity 210 and probabilities $P_1$ and $P_2$ for the probability of occurrence 220 may be defined as needed for the project.

The prioritization matrix 200 may be divided into various regions 201-206 as needed to categorize the risks based upon the impact and probability occurrences. In the exemplary prioritization matrix 200, for example, the impacts 210 under cost $C_1$ are low, the impacts between costs $C_1$ and $C_2$ are medium, and impacts above cost $C_2$ are high. Likewise, in the depicted prioritization matrix 200, the probability of occurrence 220 under probability $P_1$ are low, the probabilities between probability $P_1$ and $P_2$ are medium, and probabilities above probability $P_2$ are high. For example, using the exemplary values from above Tables 1-3, Region 201 represents risks having "Very High" or "High" Probability and "Very High" or "High" Severity Region 202 represents risks having "Very High" or "High" Probability and "Medium" Severity or "Medium" Probability and "Very High" or "High" Severity Region 203 represents risks having "Medium" Probability and "Medium" Severity Region 204 represents risks having "Very Low" or "Low" Probability and "Very High" or "High" Severity or "Very High" or "High" Probability and "Very Low" or "Low" Severity Region 205 represents risks having "Medium" Probability and "Very Low" or "Low" Severity or "Very Low" or "Low" Probability and "Medium" Severity Region 206 represents risks having "Very Low" or "Low" Probability and "Very Low" or "Low" Severity Certain selected regions of the prioritization matrix 200 presented in FIG. 2 may be designated as areas of interest, or prioritized risks 230. For example, the risks positioned in regions 201, 202 or 203 may receive the classification of "priority risks" and then have appropriate response plans defined in step 130. Similarly, the risks positioned in the other regions 204-206 may receive a classification of "risks under observation", and remain under a regular monitoring for verification of any possible change in their status to "priority risks". While the present discussion describes the prioritization matrix 200 as having nine defined regions classified into six categories for ease of discussion, it should be appreciated that any numbers of categories and categorization criteria may be defined as desired by a user.

Either or both of the impact axis 210 and occurrence probability axes 210 utilized to delimitate regions of the prioritization matrix 200 can have their position changed according to the project's profile. For example, in more conservative projects with greater risk aversion, the prioritization matrix 200 may be adapted to increase the scope of risks to be examined with greater scrutiny, such as enlarging the scope of regions 201-203 to increase the area considered for "priority risks".

Returning now to FIG. 1A, the next step in the risk management process 100 is to plan response to the identified risks in step 130 using known techniques. Typically, there are limited resources in a project environment, so the risks will need to be prioritized, with greater resources being allocated to certain risks. After the risks are identified in step 110 and qualified in step 120, it is possible to obtain a list of the project's priority risks and, with that, to concentrate the mitigation efforts in step 130 in the certain events and to facilitate the managers' decision making process. For example, resources may be allocated to risks having expected results (e.g., the probability of occurrence multiplied by the calculated cost impact from occurrence of the risk). As described above, the risks may be optionally categorized in step 125, such as positioning the various risks into the prioritization matrix 200, and the project's risks may be prioritized according to the categorization.

Various problems may arise in the ranking/classification of the risks. With excessive risk aversion, too many risks are selected and the limited project resources may be stretched too thin and causing important risks to receive insufficient attention. Another problem that may arise in risk classification 120 is that the expected cost impacts produced in step 123 may not fully capture the effects of the risks to the project since the cost effects may occur over different time periods.

Figure 3:
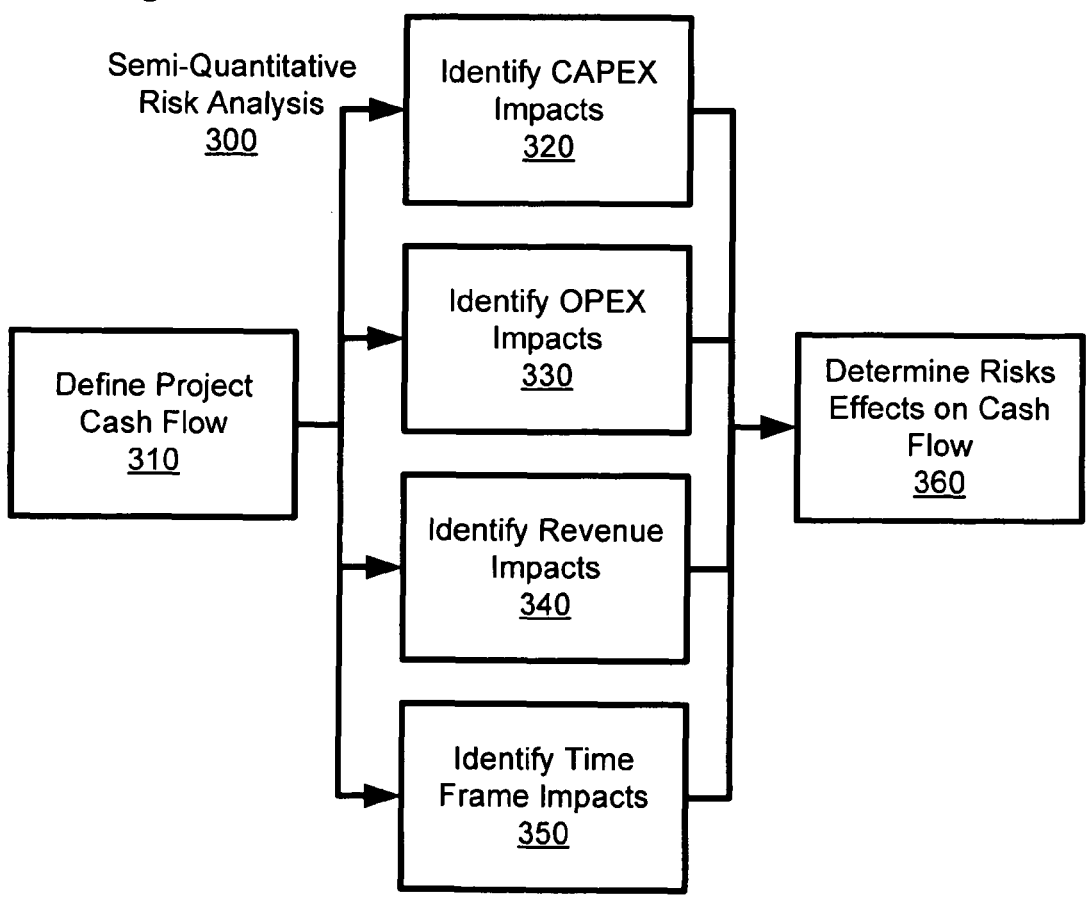

Referring now to FIG. 3, embodiments of the present invention address these and other concerns through a semi-quantitative risk analysis methodology 300 that allows the comparison of all project risks from the same standpoint, without any distortions or partial analyses. Also, through the use of this methodology it is possible to evidence the main impacts of a risk in a clearer manner.

The semi-quantitative risk analysis methodology 300 first defines a project's project cash flow, namely its Net Present Value (NPV) at different times, in step 310. The NPV is one of the main indicators used by the market to evaluate the economic feasibility of a project. Net present value (or NPV) is a standard method in finance of capital budgeting, i.e., the planning of long-term investments. Using the NPV method a potential investment project should be undertaken if the present value of all cash inflows minus the present value of all cash outflows (which equals the net present value) is greater than zero. A key input into this process is the interest rate or "discount rate" which is used to discount future cash flows to their present values. If the discount rate is equal to the shareholder's required rate of return, any NPV>0 means that the required return has been exceeded. Thus managers should undertake all projects that have an NPV>0, or if two projects are mutually exclusive, they should choose the one with the highest positive NPV.

For example, suppose that X corporation must decide whether to introduce a new product line. The new product will have startup costs, operational costs, and incoming cash flows over six years. This project will have an immediate (t=0) cash outflow of $100,000 (which might include machinery, and employee training costs). Other cash outflows for years 1-6 are expected to be $5,000 per year. Cash inflows are expected to be $30,000 per year for years 1-6. All cash flows are after-tax, and there are no cash flows expected after year 6. The required rate of return is 10%. The present value (PV) can be calculated for each year:

$T=0 - \$100,000/1.10^0 = -\$100,000$ PV.

$T=1 (\$30,000 - \$5,000)/1.10^1 = \$22,727$ PV.

$T=2 (\$30,000 - \$5,000)/1.10^2 = \$20,661$ PV.

$T=3 (\$30,000 - \$5,000)/1.10^3 = \$18,783$ PV.

$T=4 (\$30,000 - \$5,000)/1.10^4 = \$17,075$ PV.

$T=5 (\$30,000 - \$5,000)/1.10^5 = \$15,523$ PV.

$T=6 (\$30,000 - \$5,000)/1.10^6 = \$14,112$ PV.

The sum of all these present values is the net present value, which equals $8,882. Since the NPV is greater than zero, the corporation should invest in the project. More realistic problems would need to consider other factors, generally including the calculation of taxes, uneven cash flows, and salvage values, as well as other risks as defined below.

Net Present Value can thus be calculated by the following formula, where t is the amount of time (usually in years) that cash has been invested in the project, N the total length of the project (in this case, five years), i the cost of capital and C the cash flow at that point in time.

$$NPV = \sum_{t=0}^{N} \frac{C_t}{(1+i)^t} \quad \text{(Eq. 1)}$$

The above example is based on a constant rate being used for future interest rate predictions and works very well for small amounts of money or short time horizons. Any calculations which involve large amounts or protracted time spans will use a yield curve to give different rates for the various time points on the calculation. So, the rate for 1 year may be the 10%—the (money market) rate while the rate for 2 years may be 11% and that for 3 years 11.5%, and so on.

Figure 4A:
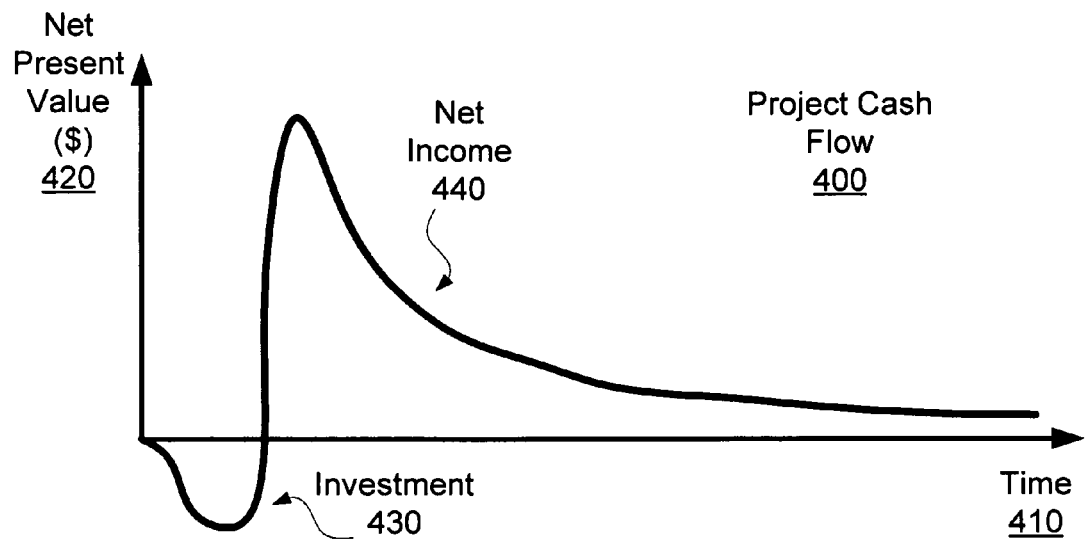
FIGS. 4A-4D are graphs depicting project cash flows and net present values in accordance with embodiments of the present invention.

Referring now to FIG. 4A, a project may be characterized in step 310 by a project cash flow 400, representing the project's NPV 420 at a time 410. It should be appreciated that a project cash flow 400 may have drastically different characteristics according to the specific nature and features of the project, and that the particular exemplary project cash flow 400 depicted in FIG. 4A is merely for illustration.

The depicted exemplary project cash flow 400 reflects a period of investment 430, or capital expenditure (CAPEX), when the project is initially unprofitable. For example, when a project typically requires initial capital and personal investment before the project can be implemented to realize any positive returns. Once the project is up and running, the project typically has a period of positive net income 440 (where income is projected revenue minus expenses). The net income 440 is initially high due to high expected revenues as new projects tend to offer desirable benefits and due to low operational costs (OPEX). As time goes by, the project will become less profitable as initial benefits are exploited and the maintenance costs increase as equipment wears out and replacement employees need to be trained, and as the time value of money used to discount the returns increases over long periods. Scheduling delays, while they may not effect the project cash flow 400, may effect the timing of the project cash flow 400.

Thus, a risk may have an impact on CAPEX, on OPEX, and/or on the project's expected revenues, so an embodiment of the present invention provides a improved risk comparison by allowing the comparison of different risks according to expected impact on NPV, including the timing of the impact to NPV. Returning to FIG. 3, the semi-quantitative risk analysis method 300 thus continues with identifying CAPEX impacts in step 320, identifying OPEX impacts in step 330, identifying revenue impacts in step 340, and identifying time frame impacts in step 350. As described in greater detail below, in order to obtain the sum of the impacts of a risk, step 320-340 entails expressing the impacts of risk in a common metric, namely the impact of the risk on the project's NPV. The NPV is one of the main indicators used by the market to evaluate the economic feasibility of a project. By means of economic studies and sensibility analyses it has been possible to calculate the conversion factors related to these and other parameters that are reflected in the project's NPV. With that, it is possible to estimate the actual impact of each risk and calculate how the project's NPV will be affected, should the risk become real. The methods utilized for estimating the parameters of the impact on a project's CAPEX in step 320, OPEX in step 330, revenue in step 340 and time frame in step 350 are based on the analysis of the curve estimated for project cash flow 400.

In step 360, the risks may be evaluated according to their impacts on NPV and cash flow as determined in step 320-350. With all the risks qualified according to their impacts on the CAPEX, OPEX, revenue time frame and other factors, it is possible to calculate the severity of each risk by means of the summing up of its impacts on the project's NPV. With that, the prioritization matrix 200 may be generated through the utilization of the impact values on the NPV as the measure for severity 210, making it possible to obtain the list of priority risks of the project with a reliability level much superior to that obtained when utilizing traditional methods, such as merely evaluating cost impacts.

Figure 4B:
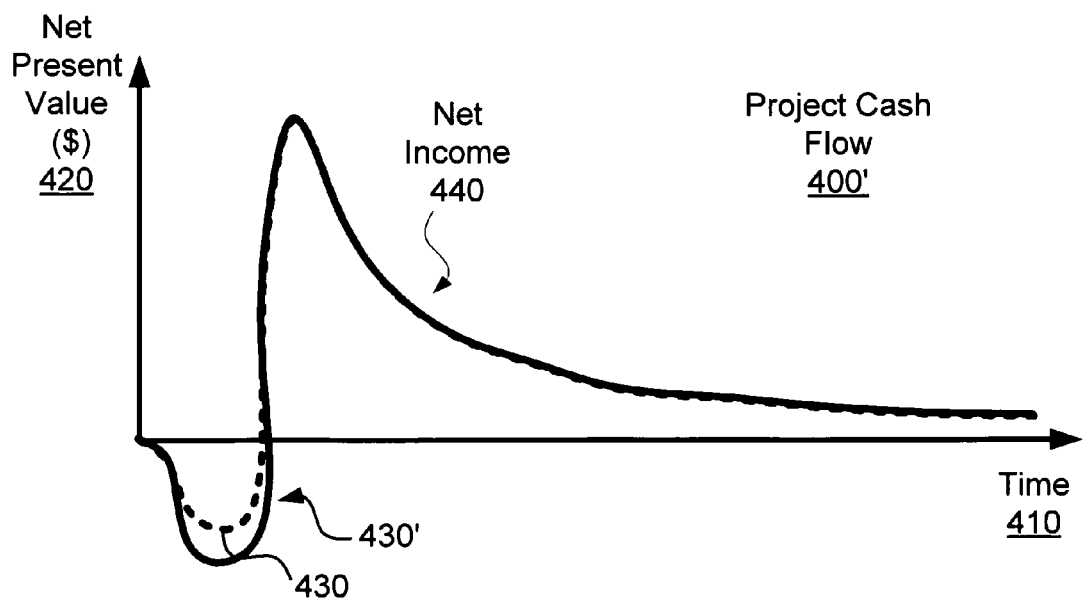

Turning now to FIG. 4B, the first adjusted project cash flow 400' reflects the increased CAPEX costs 430'. The scale of impact on the CAPEX represents the estimate of additional investment in the project should the risk become real, i.e., the impact on CAPEX represents a single disbursement for the execution of the tasks necessary for the containing or correction of the situation generated by the risk. The risks with impact on the CAPEX would be those that, when concretized, would increase the investment amount necessary for the execution of the project, thus reducing the project's NPV.

Figure 4C:
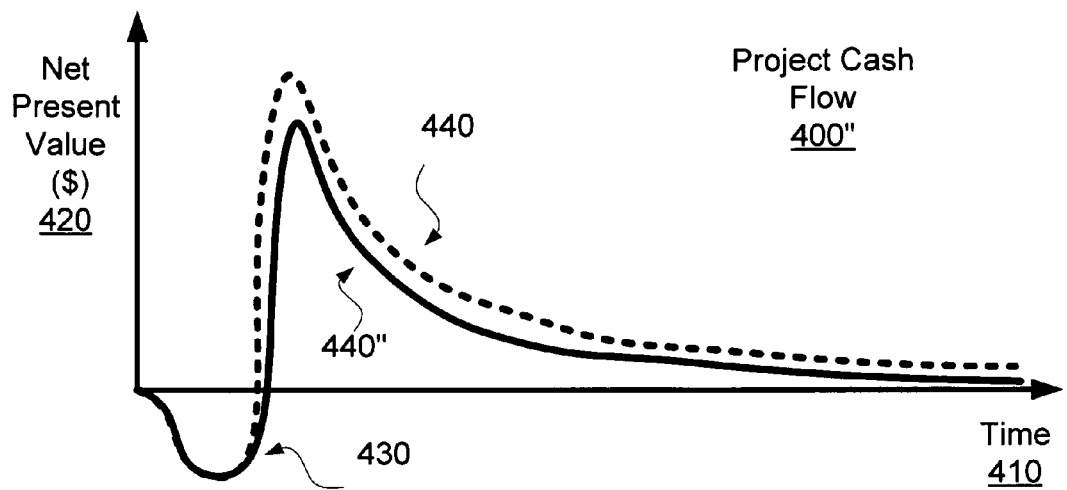

As explained above, net income 440 in the project cash flow 400 is capital revenues minus OPEX. Thus, increased OPEX will decrease net income 440. Turning now to FIG. 4C, the second adjusted cash flow 400" may reflect an increase in OPEX and represents an estimate of the expenditures that will be added to the project's annual operational costs if the risk become real. It can be seen that increases in OPEX may decrease projected cash flow 400" throughout a wide time period.

Figure 4D:
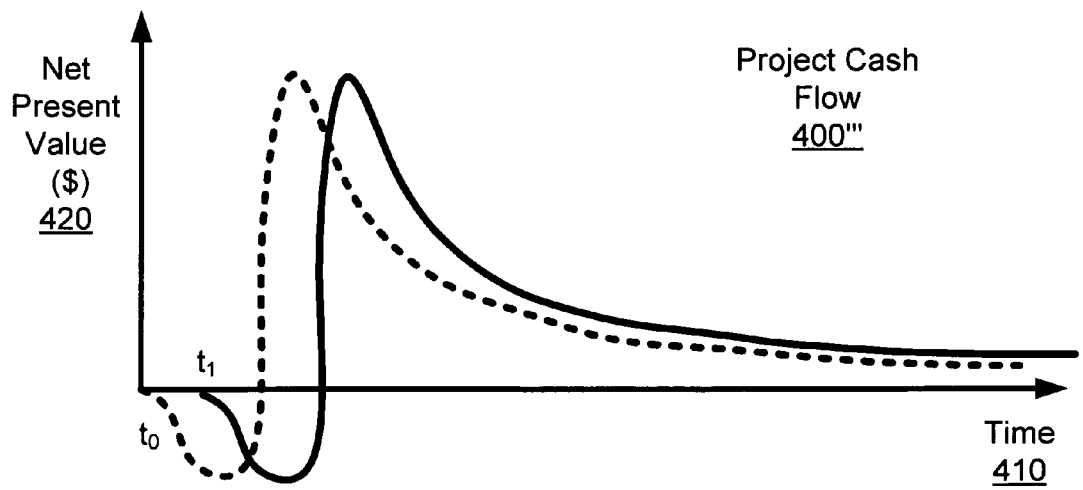

Likewise, the second project cash flow 400" in FIG. 4C reflecting decrease NPV may be caused through decreased capital revenues. The impact on the revenue represents the estimated reduction in the project's expected revenue should the risk occur. This impact has the effect of changing the revenue in the cash flow of the whole project. These types of risks, for example, effect prices or otherwise limit production and/or volumes Turning now to FIG. 4D, a third adjusted project cash flow 400''' reflects a risks impact on the Time Frame. There is the impact on the time frame, which represents a delay (from $T_0$ to $T_1$) in the beginning of the project's operation and which causes the dislocation of the project's cash flow through time, without affecting its dimensions. While not depicted, the third adjusted project cash flow 400''' will likely reflect a decrease in NPV since the time value of money factor used to discount money gains, as described above, increases over time, thereby reducing the same revenue if received at a later date. Risks with an impact on the time frame are those that, should they become real, would affect, for example, the date of the first production.

Figure 5:
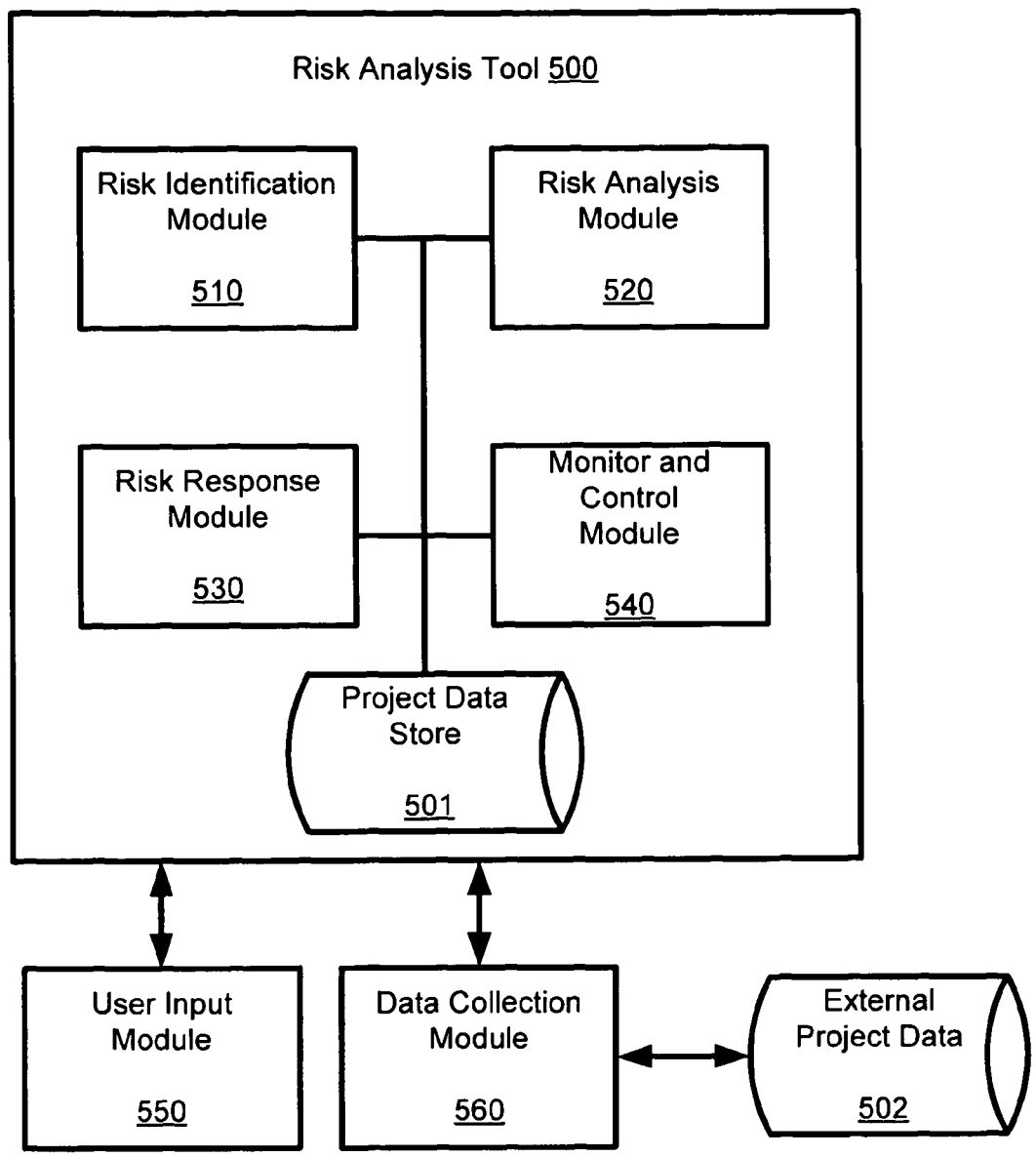
FIG. 5 is a schematic diagram of system for implementing the semi-quantitative risk management process of FIGS. 1A-1B and 3.

As depicted in FIG. 5, embodiments of the present invention provide a computerized risk management tool 500. In order to support the whole risk management process, the tool 500 integrates the identification, qualification and development of the responses, as well as their control and follow-up. As described below, the tool 500 implements the semi-quantitative risk analysis methodology 100, being able to register the probability of an occurrence and the estimated impacts of each risk, a well as calculate the impact on the project's NPV, automatically informing the priority of each risk. Additionally, the tool provides a work flow that comprises the whole process, will all those involved being constantly informed on the evolution of the situation of the risks and their response plans. Another important benefit deriving from the utilization of the semi-quantitative analysis and that has also been incorporated by the tool in question is the utilization of more reliable indicators to evaluate the risk management effectiveness and measure the benefits achieved.

Returning to FIG. 5, the risk management tool 500 may be a software-driven application including modules that automatically perform each of the steps of the risk management method 100. Specifically, the risk management system 500 may have modules 510, 520, 530, and 540 for performing the functions of, respectively, risk identification, definition of the risk impacts, development of the corresponding responses, and monitoring and control of project risks. For instance, in one implementation, the risk management tool 500 is a spreadsheet application (such as an application written in VisualBasic® for Excel®, both marketed by Microsoft Corp. of Redman, Wash.) that receives various financial data and user inputs, and uses these inputs to calculate the project cash flow as needed for the semi-quantitative risk assessment using stored project data 501.

In another embodiment, the risk management tool 500 includes a user input module 550 that allows a user to edit or specify the stored project data 501. For example, the user input module 550 may comprise a served webpage form containing blank fields to allow the user to specify various aspects of the project and its risks, along with known technology to receive and store the user's inputs. As depicted in FIG. 6, to assist the user, an input form 600 may contain various drop down menu and examples, along with other known technology to allow the user to automatically specify data, along with the ability to access and use stored data. The tool 500 may further visually display results, such as the above-described risk prioritization matrix depicted in FIG. 2, through the user input module 550.

The risk management tool 500 may further includes data collection module 560 that automatically collects relevant external project data 502. For example, the data collection module 560 may be programmed to collect certain relevant external project data 502, such as project or economic status data, in real time so that the risks identification, analysis, response, and monitoring and control may be performed and repeated using the recent data. For example, interest rate changes to be used to update net present value calculations. For instance, the data collection module 560 may include software application such as data mining applications in Extended Meta Language (XML), not depicted, that automatically search for and return relevant information from the external data repository 502.

Optionally, the risk management tool 500 may be connected to the user input 550 and the data collection module remotely via a distributed network such as the Internet. In this embodiment, the risk management tool 500 may be an application present on an Internet server and is accessible to various users and applications via the distributed network.

In one embodiment, the tool 500 automatically processes a series of indicators, the main one being the quantification of the total benefit for the project deriving from the adoption of the risk management process. This indicator is calculated by subtracting the avoided risks' total impact figure from the expected risks' total impact figure.

Despite being well known among project managers, the risk management discipline can present results with a low reliability if the qualitative analysis process is executed in a simplified manner. The application of the semi-quantitative risk analysis methodology allows the project manager, with a little additional effort, to elevate the quality of the collected information, the main success factor for the good management of risks in a project, thus preventing any deviations or partial results, speeding up the decision making process and contributing for the managers and other personnel responsible for the control and monitoring of the process to direct their efforts to those risks that are really critical to the project's success.

Conclusion

The foregoing description of the preferred embodiments of the invention has been presented for the purposes of illustration and description. It is not intended to be exhaustive or to limit the invention to the precise form disclosed. Many modifications and variations are possible in light of the above teaching. For instance, the method of the present invention may be modified as needed to incorporate new communication networks and protocols as they are developed. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed:

1. A computer-implemented project risk assessment method comprising:

a computer receiving and storing project data, wherein said project data defines the net present value (NPV) of a project over a time period;

said computer identifying a plurality of project risks using said project data;

said computer, for each of the project risks, defining an impact to the NPV and a probability of occurrence;

said computer continuously prioritizing each of the project risks in real-time according to the risks' respective impacts to NPV and probability of occurrence;

said computer continuously selecting the project risk with the greatest priority in real-time;

said computer planning a response to the selected project risks;

said computer monitoring said project and said response in real time;

said computer generating:

an avoided risks total impact figure based on the risks avoided by adopting the response;

an expected risks total impact figure based on the risks expected by adopting the response; and a total benefit for the project, the total benefit being calculated by subtracting the avoided risks total impact figure from the expected risks total impact figure; and said computer generating a risk prioritization matrix and categorizing the risk within a region of the risk prioritization matrix based on the NPV and the probability of occurrence, wherein the response is based on the region where the risk is categorized.

2. The computer-implemented project risk assessment method of claim 1, wherein the step of defining an impact to the NPV and a probability of occurrence for each of the risks comprises the computer classifying the impact to the NPV and the computer classifying a probability of occurrence.

3. The computer-implemented project risk assessment method of claim 1, wherein the step of the computer selecting one or more of the project risks comprises classifying the risks into a plurality of categories according to the risks' respective impacts to NPV and probability of occurrence, and selecting any of the risks occurring in one of the categories.

4. The computer-implemented project risk assessment method of claim 1, wherein the step of defining an impact to the NPV and a probability of occurrence for each of the risks comprises the computer creating a risk prioritization matrix that graphically displays the impacts and occurrence probabilities for the risks.

5. The computer-implemented project risk assessment method of claim 1, wherein the step of defining an impact to the NPV and a probability of occurrence for each of the risks comprises:

defining a project cash flow; and determining the risks effects on the project cash flow.

6. The computer-implemented project risk assessment method of claim 5, wherein the step of defining an impact to the NPV and a probability of occurrence for each of the risks further comprises identifying CAPEX impacts, OPEX impacts, revenue impacts, and time frame impacts for each of the risks.

7. A computer-implemented project risk assessment system comprising:

means for receiving and storing project data, wherein said project data defines the net present value (NPV) of a project over time period;

means for identifying a plurality of project risks using said project data; means for defining an impact to the NPV and a probability of occurrence for each of the project risks;

means for continuously prioritizing each of the project risks in real-time according to the risks' respective impacts to NPV and probability of occurrence;

means for continuously selecting the project risk with the greatest priority in real-time means for planning a response to the selected project risks;

means for monitoring said project and said response in real time;

means for generating:
  an avoided risks total impact figure based on the risks avoided by adopting the response;
  an expected risks total impact figure based on the risks expected by adopting the response; and
  a total benefit for the project, the total benefit being calculated by subtracting the avoided risks total impact figure from the expected risks total impact figure; and means for generating a risk prioritization matrix and categorizing the risk within a region of the risk prioritization matrix based on the NPV and the probability of occurrence, wherein the response is based on the region where the risk is categorized.

8. The computer-implemented project risk assessment system of claim 7, wherein the means of defining an impact to the NPV and a probability of occurrence for each of the risks comprises the means for classifying the impact to the NPV and means for classifying a probability of occurrence.

9. The computer-implemented project risk assessment system of claim 7, wherein the means for selecting one or more of the project risks comprises means for classifying the risks into a plurality of categories according to the risks' respective impacts to NPV and probability of occurrence; and means for selecting any of the risks occurring in one of the categories.

10. The computer-implemented project risk assessment system of claim 7, wherein the means for defining an impact to the NPV and a probability of occurrence for each of the risks comprises the computer creating a risk prioritization matrix that graphically displays the impacts and occurrence probabilities for the risks.

11. The computer-implemented project risk assessment system of claim 7, wherein the means for defining an impact to the NPV and a probability of occurrence for each of the risks comprises:
  means for defining a project cash flow; and
  means for determining the risks effects on the project cash flow.

12. The computer-implemented project risk assessment system of claim 11, wherein the means for defining an impact to the NPV and a probability of occurrence for each of the risks further comprises means for identifying CAPEX impacts, OPEX impacts, revenue impacts, and time frame impacts for each of the risks.

13. A computer recordable medium storing a program of instruction for implementing a project risk assessment method, wherein the method comprises:

receiving and storing project data, wherein said project data defines the net present value (NPV) of a project over a time period;

identifying a plurality of project risks using said project data;

for each of the project risks, defining an impact to the NPV and a probability of occurrence;

continuously prioritizing the project risks in real-time according to the risks' respective impacts to NPV and probability of occurrence;

continuously selecting the project risk with the greatest priority in real-time;

planning a response to the selected project risks;

monitoring said project and said response;

generating:
  an avoided risks total impact figure based on the risks avoided by adopting the response;
  an expected risks total impact figure based on the risks expected by adopting the response; and
  a total benefit for the project, the total benefit being calculated by subtracting the avoided risks total impact figure from the expected risks total impact figure; and generating a risk prioritization matrix and categorizing the risk within a region of the risk prioritization matrix based on the NPV and the probability of occurrence, wherein the response is based on the region where the risk is categorized.

14. The computer recordable medium storing a program of instruction for implementing a project risk assessment method of claim 13, wherein the step of defining an impact to the NPV and a probability of occurrence for each of the risks comprises classifying the impact to the NPV and classifying a probability of occurrence.

15. The computer recordable medium storing a program of instruction for implementing a project risk assessment method of claim 13, wherein the step of selecting one or more of the project risks comprises classifying the risks into a plurality of categories according to the risks' respective impacts to NPV and probability of occurrence, and selecting any of the risks occurring in one of the categories.

16. A computer recordable medium storing a program of instruction for implementing a project risk assessment method of claim 13, wherein the step of defining an impact to the NPV and a probability of occurrence for each of the risks comprises creating a risk prioritization matrix that graphically displays the impacts and occurrence probabilities for the risks.

17. The computer recordable medium storing a program of instruction for implementing a project risk assessment method of claim 13, wherein the step of defining an impact to the NPV and a probability of occurrence for each of the risks comprises defining a project cash flow; and determining the risks effects on the project cash flow.

18. The computer recordable medium storing a program of instruction for implementing a project risk assessment method of claim 17, wherein the step of defining an impact to the NPV and a probability of occurrence for each of the risks further comprises identifying CAPEX impacts, OPEX impacts, revenue impacts, and time frame impacts for each of the risks.

19. The computer-implemented project risk assessment method of claim 1, wherein planning the response comprises planning mitigation actions, establishing goals, and defining responsibility for the project risks and the mitigation actions.

20. The computer-implemented projected risk assessment method of claim 1, further comprising:

said computer updating the project data and storing the updated project data based on said computer monitoring; and said computer identifying an updated risk using said updated project data.

21. The computer-implemented project risk assessment method of claim 1, wherein said computer defines the probability of occurrence based on a statistical model.

22. The computer-implemented project risk assessment method of claim 1, wherein planning the response to the selected project risk comprises allocating an amount of resources based on the project risk, the amount of resources being greater for project risks with higher priorities.

* * * * *